United States Patent [19]

Mair et al.

[11] 4,415,148
[45] Nov. 15, 1983

[54] RESILIENT MOUNTINGS FOR MACHINES OR MACHINE COMPONENTS, PARTICULARLY ENGINES IN MOTOR VEHICLES

[75] Inventors: Christian Mair, Munich; Johannes Van den Boom, Kosching; Heinz Hollerweger, Ingolstadt, all of Fed. Rep. of Germany

[73] Assignees: Boge GmbH, Eitorf; Audi NSU Auto Union AG, Neckarsulm, both of Fed. Rep. of Germany

[21] Appl. No.: 330,728

[22] Filed: Dec. 14, 1981

[30] Foreign Application Priority Data

Dec. 23, 1980 [DE] Fed. Rep. of Germany ....... 3048888

[51] Int. Cl.³ .............................................. F16F 15/04
[52] U.S. Cl. ................................. 267/122; 267/140.1; 267/140.2
[58] Field of Search ............... 267/140.1, 140.2, 140.3, 267/141.1, 141.2, 141.7, 136, 141.6, 141.3, 118, 113, 114, 121, 122, 123, 64.16-64.21, 64.23, 64.27, 35, 151, 152, 153; 248/562, 575, 566, 636; 188/268, 269, 378, 379

[56] References Cited

U.S. PATENT DOCUMENTS 1,734,596 11/1929 Rosenzweig ..................... 267/140.2
3,912,248 10/1975 Pickford et al. ................ 248/562 X

FOREIGN PATENT DOCUMENTS 2947018 5/1981 Fed. Rep. of Germany ... 267/140.1
788484 1/1958 United Kingdom ............. 267/140.2

Primary Examiner—Douglas C. Butler
Attorney, Agent, or Firm—William R. Hinds

[57] ABSTRACT

In an arrangement according to this disclosure, a spring element (3, 7) is arranged between a mounting core member (2) and a support (6) and is connected to a damper mass (9, 12). The damper mass has a container (10) which is filled with pressure liquid and/or gas and closed by a diaphragm (13). The spring rate of the diaphragm can be varied as desired, particularly in dependence on the speed of rotation of the machine or engine. For varying the spring rate of the diaphragm, a pressure plate (15) is associated with the diaphragm, and is displaceable relative to the diaphragm by way of an adjusting arrangement (16, 17) dependent on the speed of rotation of the machine or engine, and the relative configurations of the pressure plate and the facing diaphragm are such that this displacement reduces or increases the free area of the diaphragm, and thus varies its spring rate.

9 Claims, 1 Drawing Figure

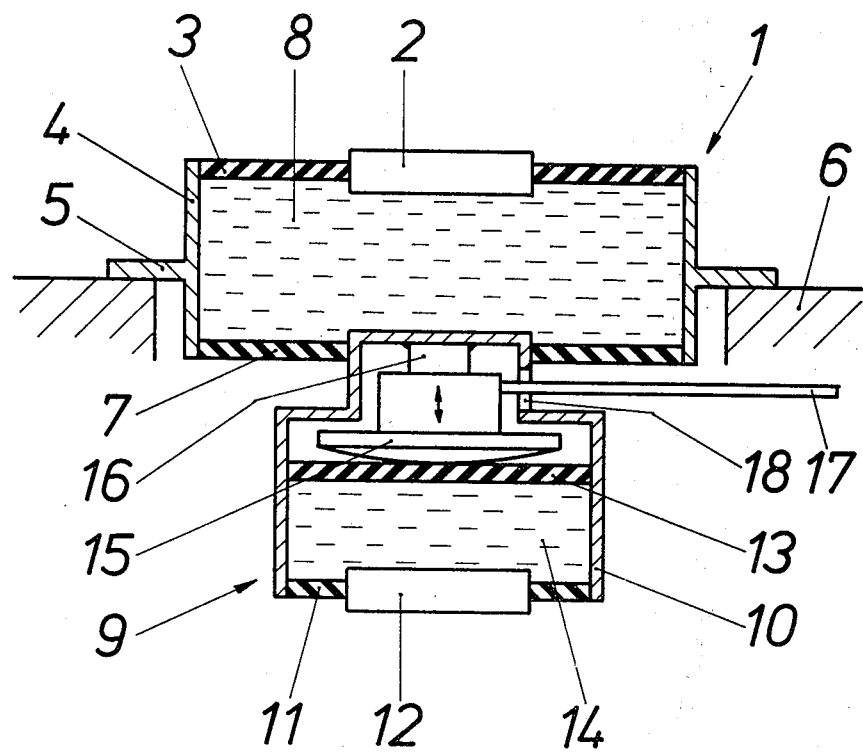

RESILIENT MOUNTINGS FOR MACHINES OR MACHINE COMPONENTS, PARTICULARLY ENGINES IN MOTOR VEHICLES

FIELD OF THE INVENTION

This invention relates to arrangements for resiliently mounting machines or machine components, for example, an internal combustion engine in a motor vehicle, the arrangement being of the type which comprises a mounting core member and a support means, and at least one spring element arranged between the mounting core member and the support means and connected for transmission of movement to an oscillatory damper mass, wherein the damper mass has a container which is filled with pressure liquid and/or gas and which is closed by a diaphragm with a varying spring rate.

BACKGROUND AND SUMMARY

West German patent application No. P 29 47 018.6 discloses a resilient mounting member, in particular for mounting an internal combustion engine in a motor vehicle, which comprises a mounting core member, a support means, and at least one spring element disposed therebetween. In that arrangement, the spring element is connected for the transmission of movement to an oscillatory or amortization mass which, in the event of oscillatory movements of the mounting core member with respect to the support means, is also excited to a condition of oscillation. By virtue of this arrangement, the transmission of force or energy from the mounting core member to the support means is no longer dependent solely on the amplitude of oscillation of the mounting core member and the spring rate of the spring element, but additionally is also dependent to a degree on the frequency. Thus, at low frequencies, the transmission mode or performance substantially corresponds to that without a damper mass, while with increasing frequencies, the transmission of force also increases up to the natural frequency of the damper mass, but then falls, so that, at sufficiently high frequencies, the mode of force transmission attained is below the value determined by the static spring rate. In this resilient mounting arrangement, the damper mass can have a container which is filled with pressure liquid and/or gas and which is closed off by a diaphragm with a varying spring rate. For varying the spring rate, there is provided in the region of the diaphragm a contact surface against which the diaphragm increasingly comes to lie as the pressure in the container increases, that is to say, the spring rate is varied in dependence on the pressure in the container.

The present invention is based on the object of improving an apparatus of the general kind set forth above, such that the spring rate of the diaphragm can be varied in a desired manner, selectively, with a reduction in cost and an increase in the degree of accuracy.

Generally according to the invention, this object is achieved in that a pressure plate which is connected to an adjusting means is associated with the diaphragm. The adjusting means makes it possible for the pressure plate to be moved toward the diaphragm precisely by a predetermined amount, whereby the spring rate and the frequency of the diaphragm can be varied in the desired manner, without necessitating variations of the pressure in the container. The contour of the diaphragm and the corresponding contour of the pressure plate, which can be of a generally convex or conical configuration, are easily matched to each other so as to permit a substantially linear shift in frequency when there is a linear forward movement of the pressure plate.

The arrangement according to the invention is suitable not only for resiliently mounting internal combustion engines in motor vehicles, but for practically all situations in which the transmission of oscillatory movements in given frequency ranges is to be suppressed. The situations may also include those involving level adjustment, constant level maintenance, and damping.

Further details, features and advantages of arrangements in accordance with the invention will be apparent to those skilled in the art and described in greater detail hereinafter, with reference to a preferred embodiment illustrated in the drawing.

BRIEF DESCRIPTION OF THE DRAWING

The single FIGURE schematically illustrates in section an embodiment in accordance with the invention, illustrating generally only those features such as will facilitate ready understanding of the invention by those skilled in the art.

DESCRIPTION OF PREFERRED EMBODIMENTS

Referring to the drawing, illustrated therein in a very simplified manner is an arrangement 1 for resiliently mounting an internal combustion engine in a motor vehicle. The arrangement comprises a mounting core member 2 which is connected to one end of a hollow cylindrical metal body 4 by way of a diaphragm 3, typically of rubber. The metal body 4 has an external annular flange 5 by way of which the metal body is supported on a support means 6, which may be also annular. Typically, mounting core member 2 partially supports the engine, while support means 6 comprises or is connected to the body of the motor vehicle, although it will be understood that the reverse arrangement would be possible.

Connected to the other end of the hollow cylindrical metal body 4 is a diaphragm 7, thereby forming a space 8 which is delimited by the metal body 4 and the diaphragms 3 and 7, and which is filled with pressure liquid or gas by way of an opening (not shown) which is adapted to be closed off.

Connected to the diaphragm 7 is an intermediate mass 9 which, in the illustrated embodiment, has a stepped cylindrical container 10, closed at its upper end so at to maintain the sealed state of space 8. At its lower end, the container 10 is closed by a diaphragm 11, typically of rubber. As shown in the drawing, the diaphragm 11 is provided with a damper or amortization mass 12.

A further diaphragm 13 is sealingly inserted into the container 10, the diaphragm enclosing a space or chamber 14 which is filled with pressure liquid and/or gas. The pressure liquid and/or gas is introduced into chamber 14 by way of an opening (not shown) which is provided, for instance, in the mass 12, and which can also be closed off.

Provided between the diaphragm 13 and the upper end of the container 10 is a pressure plate 15 which is of a conical or convex configuration at its surface which is adjacent and toward the diaphragm 13. The pressure plate 15 is threadedly carried by a screw-threaded pin member 16 which bears against or is secured to the upper end of the container 10. The pressure plate 15 is moved either toward or away from the diaphragm 13 by suitable rotary movement of the pressure plate 15. This produces a reduction or an increase in the amount of free surface area of the diaphragm 13, that is, the amount of surface area that is out of contact with the pressure plate and thus free to deflect. This results in a change in the spring rate and thus in the frequency. By making the pressure surface of the pressure plate 15 of a suitable configuration, it is possible to ensure that the damper frequency also changes or shifts linearly when the pressure plate 15 is displaced linearly.

For producing axial movement of the pressure plate 15, the pressure plate has associated therewith a lever 17 which projects outwardly through a slot opening 18 in the container 10 and by means of which the pressure plate 15 can be rotated on the pin member 16. The lever 17 can be coupled to an actuator responsive to engine rotation, such that the position of the lever, and hence the position of the pressure plate, will vary in dependence on the speed of rotation of the engine. Alternatively, the adjustment can be effected by an electric control motor, in accordance with engine speed or any other desired parameter. The particular manner of adjustment is not critical to the basic invention, and various control arrangements will be readily apparent to those skilled in the art.

Having thus described and illustrated preferred embodiments of our invention in the manner required by the patent statutes, we claim:

1. Apparatus for resiliently mounting supported members such as machines, machine components or rotary machinery to a supporting member, such as an internal combustion engine in a motor vehicle, comprising a mounting core member for coupling to the supported member, a support means for coupling to the supporting member, at least one spring means arranged between the mounting core member and the support means and coupled also for transmission of movement to an oscillatory damper mass such that oscillatory movement of said spring means excites oscillatory movement of said damper mass, said damper mass having a container filled with pressure fluid, a resilient diaphragm closing said container, a selectively adjustable pressure plate means disposed closely adjacent said diaphragm for variably contacting the diaphragm and varying its spring rate by varying the free area of the diaphragm, and means for selectively adjusting said pressure plate means so as to vary the damping action of said damper mass on said spring means and mounting core member.

2. Apparatus as set forth in claim 1 wherein the pressure plate means is of a convex configuration at its surface which is toward the diaphragm.

3. Apparatus as claimed in claim 2 wherein said pressure plate is substantially centered relative to the surface area of said diaphragm.

4. Apparatus as set forth in claim 1 wherein said adjusting means is adapted for actuation in dependence on the speed of rotation of rotary machinery which may be supported by the apparatus.

5. Apparatus as set forth in claim 4 wherein said adjusting means includes a spindle member on which the pressure plate is mounted.

6. Apparatus as set forth in claim 1 wherein said adjusting means is arranged between said diaphragm and a cover plate portion of the container, and is accessible from the exterior of said container.

7. Apparatus as claimed in claim 1 wherein said container includes a second diaphragm by which said damper mass is carried, said first mentioned diaphragm and said second diaphragm constituting wall portions of said fluid filled container.

8. Apparatus as claimed in claim 1, wherein said container is coupled to said spring means for oscillatory movement therewith, said container includes a second diaphragm by which said damper mass is carried, said first mentioned diaphragm and said second diaphragm being oriented generally transversely of the direction of oscillatory movement, and said adjusting means including means extending exteriorly of said container.

9. Apparatus as claimed in claim 8 wherein said spring means comprises a fluid filled further container closed by a diaphragm carrying said mounting core member and by a diaphragm carrying said first mentioned container.

* * * * *